Oct. 29, 1940.  V. H. FRAENCKEL  2,219,573
METHOD OF MAKING COMPOSITE GLASS-METAL ARTICLES
Filed June 1, 1936  2 Sheets-Sheet 1

Victor H. Fraenckel
INVENTOR
BY John J. Logan
ATTORNEY

Oct. 29, 1940.    V. H. FRAENCKEL    2,219,573
METHOD OF MAKING COMPOSITE GLASS-METAL ARTICLES
Filed June 1, 1936    2 Sheets-Sheet 2

Victor H. Fraenckel
INVENTOR

BY John J. Rogan
ATTORNEY

Patented Oct. 29, 1940

2,219,573

UNITED STATES PATENT OFFICE 2,219,573

METHOD OF MAKING COMPOSITE GLASS-METAL ARTICLES

Victor H. Fraenckel, Emporium, Pa., assignor to Hygrade Sylvania Corporation, Salem, Mass., a corporation of Massachusetts Application June 1, 1936, Serial No. 82,742

6 Claims. (Cl. 49—81)

A principal object of the invention is to provide an improved method of forming a vacuum-tight bond between a metal member and a glass or other vitreous-like body.

Another object is to provide an improved method of forming a header or base for electron discharge tubes.

A still further object is to provide an improved manner of forming a base with lead-in wires sealed therein.

A still further object is to provide an improved method of attaching a metal frame to a glass plate by a molding operation.

Other features and advantages not specifically enumerated will be apparent after a consideration of the following detailed descriptions and the appended claims.

While the invention will be described herein as embodied in certain specific forms of devices it will be understood that this is done merely for explanatory purposes and not by way of limitation. Accordingly in the drawings:

Fig. 5 is a view to explain the method of forming a base or header for electron discharge tubes such as radio tubes or the like.

Fig. 7 is a view to explain the method of forming a composite metal-glass header for radio tubes and the like.

While various methods of forming composite metal-glass articles with a vacuum-tight bond have heretofore been proposed, so far as I am aware no one has disclosed a practical method of forming such a bond between a glass or vitreous sheet and a surrounding relatively massive metal frame. While it may be possible to unite the metal frame integrally around the edges of a glass body, by using ordinary methods, I have found that the resultant bond is entirely useless when the article is to be used as part of an evacuated device such for example as a highly evacuated cathode ray tube. Furthermore while ordinary methods of forming a vacuum-tight bond may be suitable for the manufacture of small devices, they are impractical in the manufacture of very large devices such as will be described herein below. I have found that not only is it necessary to employ a metal which has the proper coefficient of expansion with respect to the glass, but it is also necessary to maintain the metal above a certain minimum temperature during the bonding operation, if a vacuum-tight bond is to be achieved. This latter step is relatively easy of accomplishment with small parts such as the bonding of wires in glass because it is possible with the usual methods, to merely heat the glass to render it plastic after which the plastic glass may be pressed into bonding engagement with the wires. This method of heating and sealing the parts is of course impractical where the metal part is relatively large or massive and more especially so where it is to be bonded to the glass within a mold. I have found that it is possible to bond, in a vacuum-tight manner, a relatively heavy metal frame around a glass window using a molding operation, by charging the mold with the glass in a very hot and molten condition, and subjecting the glass while in a flowable state to pressure whereby it is forced outwardly against the metal frame.

Figure 1:
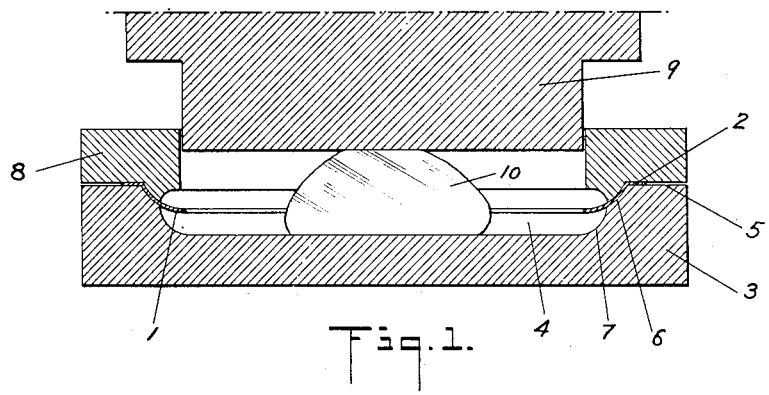
Fig. 1 is a diagrammatic view to explain the method of forming a window or screen for a cathode ray tube.
Figure 2:
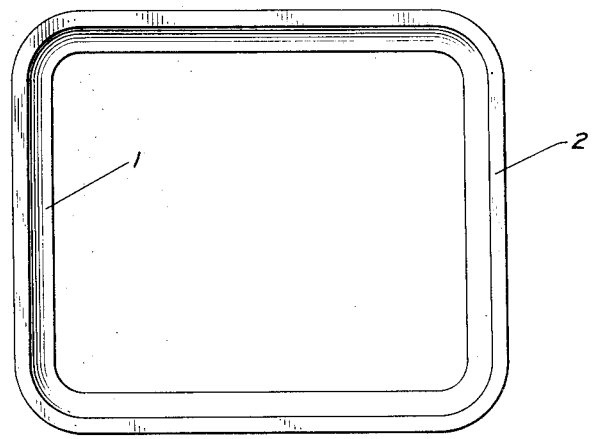
Fig. 2 is a plan view of the metal frame member used in forming the window or screen of Fig. 1.
Figure 3:
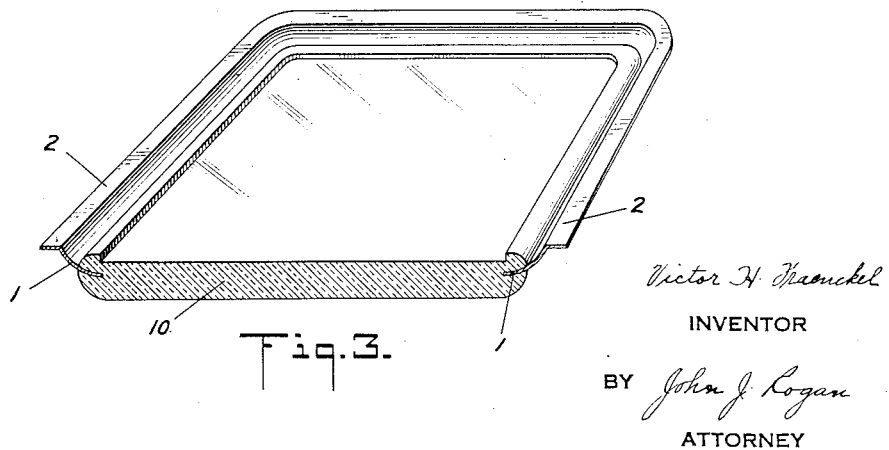
Fig. 3 is a perspective view partly in section, of a cathode ray tube screen produced in accordance with the invention.

Referring to Fig. 1, a description will now be given of the method of providing a glass or other vitreous plate with a surrounding metal frame which is bonded thereto in a vacuum-tight manner. For purposes of explanation the frame is shown in Fig. 2 as square or rectangular and it is preferably provided with a curved flange 1 united to or formed integrally with a flat rim 2. Preferably the flange 1 is of a metal having the same or similar coefficient of expansion as the glass to which it is to be bonded. Assuming for example that the glass window is to consist of glass sold commercially by the designation "Corning 705 AJ," then the metal flange 1 may be of "Kovar" consisting approximately of 54 percent iron, 28 percent nickel and 18 percent cobalt, although other similar metal such for example as Allegheny #55 alloy, consisting approximately of 0.35% carbon; 1.0% manganese; 0.6% max. silicon; 23–30% chromium; 0.6% nickel; balance iron, and Corning G12 glass may be employed.

The metal frame is positioned in a two-part mold represented schematically in section in Fig. 1 and comprising a base 3 with a rectangular molding cavity 4 corresponding in shape and size to the metal frame. The mold base 4 is also provided with a flat rim 5, a curved rim 6, and another curved rim 7. Preferably the curvature of rim 6 is the same as that of flange 1. The metal frame is seated on the mold as shown in Fig. 1 so that the flange 1 extends into the mold cavity beyond the rim 6. A suitable pressure ring 8 is provided to hold the metal frame rigidly in position during the molding operation. A pressure plunger 9 is provided to exert molding pressure on the glass charge within the mold. In accordance with the present invention the glass charge is placed in the mold in a high temperature molten condition, in the form of a hot molten mass or "gather." The glass charge is heated outside the mold to as high a temperature as is practical without destroying the desired characteristics of the glass and preferably to an incandescent temperature. When the hot molten glass is placed within the mold, it retains its fluid-like condition for a short period and the plunger 9 is moved downwardly causing the molten glass to flow outwardly until the flange 1 is embedded therein. I have found that by using a relatively large mass of molten glass, which is charged into the mold at a very high temperature, it is possible to flow the glass under pressure sufficiently fast that the flowing glass when it engages the flange 1, raises the temperature of the latter to that necessary to effect a vacuum-tight bond with the glass when the latter hardens. I have also found that to achieve this result the glass should preferably be charged into the mold at such a temperature that when it flows around the flange 1, it raises the latter to a temperature of the order of 500 degrees centigrade. It will be understood of course that the metal frame preferably has been previously oxidized in any suitable manner. While I do not desire to be limited to any particular theory as to the formation of the vacuum-tight bond between the glass plate and the metal frame, probably the glass when it engages the metal raises it to a sufficiently high temperature at which the oxide of the metal dissolves in the molten glass. It will also be understood that the mold faces are of a material having such heat conductivity and mass that the molten glass does not adhere thereto.

Figure 4:
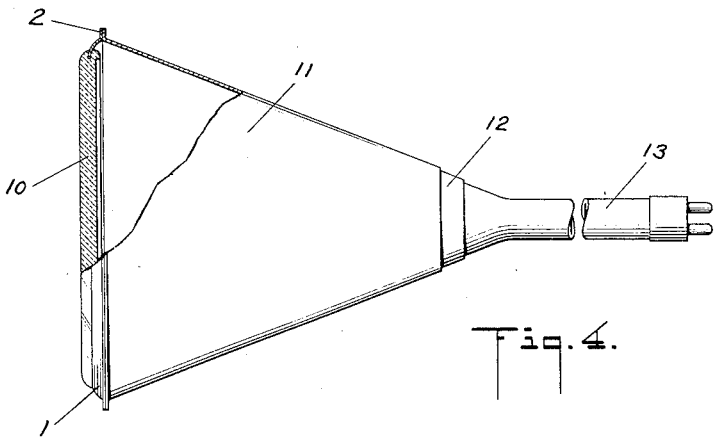
Fig. 4 is a schematic sectional view of a cathode ray tube envelope in which the screen of Fig. 3 is incorporated.

While a metal frame member such as described may be used in a wide variety of devices it is particularly well-suited as the window or screen of a cathode ray tube. Thus as shown in Fig. 4 the window is hermetically fastened to a tapered metal tube 11 which at its constricted end may be sealed to a short length 12 of "Kovar" or similar metal and to which the glass stem tube 13 may be sealed. By employing the above-described process in making the window, it is possible to provide a substantially flat viewing end to the cathode ray tube, and it is also possible to apply the usual fluorescent coating to the inner surface of the window and to treat it, prior to sealing the window to the tube. It is also possible to manufacture a cathode ray tube in which the main length 11 is of metal while providing a vacuum-tight seal to the window portion.

Figure 5:
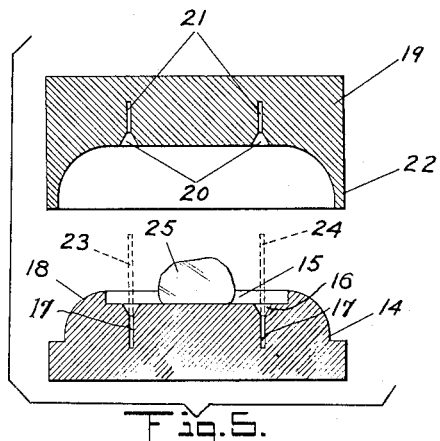
Figure 6:
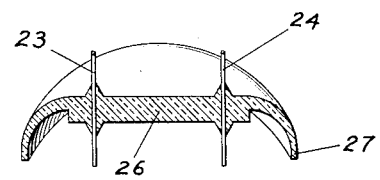
Fig. 6 is a sectional-perspective view of a base or header produced in accordance with Fig. 5.

The method of molding according to the invention is not limited to the manufacture of a screen for cathode ray tubes and the broad principle may be applied to the manufacture of bases or headers for radio tubes, electric lamps and similar devices. Thus there is shown in Fig. 5 a mold that may be used in the manufacture of a disc-like base or header for a radio tube or lamp. The mold comprises a base 14 having a circular molding cavity 15, the bottom of the cavity being provided with a plurality of small V-shaped recesses 16 terminating in elongated narrow recesses 17. Preferably the rim of the base is curved as indicated by numeral 18 for purposes to be described. The upper molding member is likewise provided with a plurality of small V-shaped recesses 20 terminating in elongated narrow recesses 21, the recesses 20, 21 being in alignment with the corresponding recesses 16, 17. If desired, the member 19 may be provided with a downwardly depending edge 22 which co-operates with the curved rim 18 for the purpose of forming the skirt on the base. The manner of using the mold of Fig. 5 to form the base is substantially the same as that already described in connection wtih Fig. 1. Prior to charging the mold with the molten glass, short lengths of lead-in wire 23 are positioned in the recesses 17 and then the mass of molten glass 25 is placed in the mold. Thereupon the member 19 is pressed downwardly causing the molten glass to flow around the lead-in wires which become embedded therein. Because of the high temperature of the glass the lead-in wires are brought to the proper temperature to form a vacuum-tight bond. The resultant product is shown in partial section in Fig. 6 and consists of a disc-like portion 26 having an integral depending flange or skirt 27 to which the usual tube envelope may be sealed as is well-known in the radio tube art.

Figure 7:
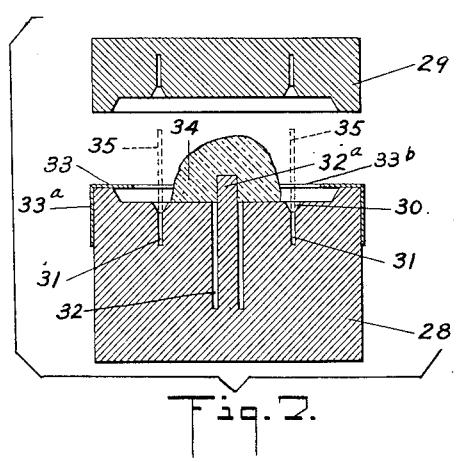
Figure 8:
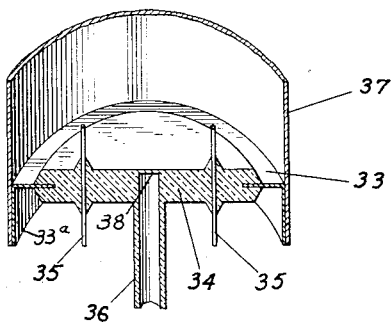
Fig. 8 is a sectional-perspective view of a base or header produced in accordance with Fig. 7.

In certain kinds of radio tubes, it may be desirable to provide a metal wall for the enclosing envelope and the process described above is very well-suited to the formation of such a tube. Thus as shown in Fig. 7 the mold is in general the same as that of Fig. 5 except that in Fig. 7 the skirt forming portion is omitted. Instead of the header being provided with a glass skirt a metal skirt is provided. The upper and lower mold members 28, 29 are provided with circular mold cavities and with recesses 30, 31 to receive the lead-in wires 35. The central part of the lower mold is provided with an annular cylindrical recess 32 defining an upwardly projecting member 32a for molding the exhaust tube. In using the mold the metal cup-shaped member 33 is seated on the mold member 28 as shown, it being understood that the bottom of member 33 is provided with a circular cut-out 33a as shown. The lead-in wires 35 are positioned in the recesses 31 and a "gather" 34 of molten glass is placed in the mold whereupon the member 29 is moved downwardly under pressure to embed the lead-in wires 35 and the member 33 in the glass. Here again the molding pressure is exerted immediately after the "gather" 34 is placed in the mold so that the molding pressure causes the molten glass to flow outwardly to the member 33 which is thereby raised to the proper temperature to effect a vacuum tight seal. The product resulting from the molding operation is shown in partial section in Fig. 8. This figure also shows the metal skirt 33a hermetically sealed as by welding and brazing to a tubular metal enclosing member 37, it being understood of course that prior to assembling the envelope 37 on the header the usual electrode assembly is mounted on the header. While the drawing shows only two lead-in wires it will be uderstood that a greater number may be sealed into the header depending upon the number of electrodes to be used and the number of supports required from the header. It will be understood of course that the metal enclosing envelope 37 may, if desired, constitute one of the electrodes of the finished tube.

While certain specific embodiments have been disclosed herein, it will be understood that various changes and modifications may be made therein without departing from the spirit and scope of the invention. Thus the tubulation 36 may be used directly for evacuating the tube or if desired an additional length of tubing may be sealed to tubulation 36 for this purpose, it being understood that during the usual heat treatment of the tube the portion 38 being relatively thin may be melted and perforated by blowing as is customary in the usual "press" type of radio tube wherein the exhaust tubulation is formed integrally with the press. Likewise, if desired, the member 32a may cooperate with a corresponding recess (not shown) in the upper molding member to provide an unobstructed passage through the tubulation 36.

What I claim is:

1. The method of forming a cathode-ray tube vitreous window with a vacuum-tight surrounding metal frame having substantially similar expansion coefficients which comprises, depositing a quantity of the molten vitreous material in a flowable condition within the frame, and immediately subjecting the molten vitreous material to pressure to form it into a sheet with the edges of the frame embedded therein in end-on relation, the temperature and mass of the molten vitreous material being sufficient to heat the embedded frame edge to a predetermined temperature which results in a vacuum-tight seal upon subsequent cooling.

2. The method according to claim 1 in which the frame edge is heated to at least 500 degrees centigrade by the molten vitreous material.

3. The method according to claim 1 in which the edge of the frame is oxidized prior to the embedding thereof in the molten vitreous material.

4. The method of forming a massive glass window with a surrounding sheet metal frame having an edge sealed into the edge of the window which comprises, supporting the frame around its outer periphery with only its inner edge extending into a mold cavity, moving a plunger into the mold to press a quantity of molten glass therein to cause the glass to flow radially outward to wet the said edge of the frame which becomes imbedded therein, and protecting the upper and lower surfaces of said edge from substantial direct transverse pressure from said plunger.

5. The method according to claim 4 in which the said edge is protected from the direct transverse pressure of the plunger by spacing said edge from the bottom of the mold and by providing a protecting lip in spaced relation above said edge.

6. The method of forming a massive glass window with a surrounding sheet metal frame having its edge sealed into the edge of the window which comprises, clamping the frame between two separable mold members which form a peripheral pocket within the mold cavity and with an edge of the frame extending therein in spaced relation to the upper and lower boundaries of the pocket, moving a plunger into the mold to press a quantity of molten glass therein to cause the glass to flow radially outward and into said pocket, said pocket protecting said edge from substantial transverse pressure of said plunger.

VICTOR H. FRAENCKEL.